United States Patent
Hamilton et al.

(10) Patent No.: US 9,860,055 B2
(45) Date of Patent: Jan. 2, 2018

(54) FLEXIBLE ARCHITECTURE FOR PROCESSING OF LARGE NUMBERS AND METHOD THEREFOR

(75) Inventors: Neil F. Hamilton, Kanata (CA); Arthur J. Low, Chelsea (CA)

(73) Assignee: Synopsys, Inc., Mountain View, CA (US)

( * ) Notice: Subject to any disclaimer, the term of this patent is extended or adjusted under 35 U.S.C. 154(b) by 1547 days.

(21) Appl. No.: 11/723,835

(22) Filed: Mar. 22, 2007

(65) Prior Publication Data

US 2007/0223687 A1    Sep. 27, 2007

Related U.S. Application Data

(60) Provisional application No. 60/784,488, filed on Mar. 22, 2006.

(51) Int. Cl.
*G06F 7/72* (2006.01)
*H04L 9/06* (2006.01)
(Continued)

(52) U.S. Cl.
CPC .......... *H04L 9/06* (2013.01); *G06F 7/00* (2013.01); *G06F 7/727* (2013.01); *G07F 7/10* (2013.01)

(58) Field of Classification Search
CPC ... H04L 9/06; G07F 7/10; G06F 7/727; G06F 7/00
(Continued)

(56) References Cited

U.S. PATENT DOCUMENTS

| | | |
|---|---|---|
| 4,351,982 A | 9/1982 | Miller et al. |
| 5,103,478 A | 4/1992 | Matyas et al. |

(Continued)

FOREIGN PATENT DOCUMENTS

| | | |
|---|---|---|
| WO | WO 89/07375 | 8/1989 |
| WO | WO 99/14881 | 3/1999 |

OTHER PUBLICATIONS

Check et al., "Designing Flexibility into Hardwired Logic," IBM technical Disclosure Bulletin, Mar. 1994, vol. 37, Issue 3, pp. 321-324. (Extracted from Delphion Intellectual Property Network Website).

(Continued)

*Primary Examiner* — Ellen Tran
(74) *Attorney, Agent, or Firm* — Jaquez Land Greenhaus LLP; Bruce W. Greenhaus, Esq.

(57) ABSTRACT

A method of implementing large number multiplication and exponentiation is provided upon a general purpose microprocessor. These large number multiplication and exponentiation processes being common to cryptography standards such as RSA and AES that typically employ numbers with 512-bits, 1024-bits, and 2048-bits. According to the invention the method establishes the size of the large number processes according to value stored within a control register, this control register and other registers storing data are configured according to this value and accessed as N-bit registers (i.e. as 1024-bit registers for 1024-bit encryption. Additionally, the multiplication and exponentiation processes are handled according to the size of an arithmetic primitive, which is established according to the hardware configuration upon which the process is operating. As such the invention allows for an encryption process to adjust both to the configuration of the host microprocessor and supporting hardware/firmware and dynamically according to degree of security determined from the value stored within the control register.

8 Claims, 7 Drawing Sheets

(51) Int. Cl.
*G07F 7/10* (2006.01)
*G06F 7/00* (2006.01)

(58) Field of Classification Search
USPC .............................................. 380/28, 29, 30
See application file for complete search history.

(56) References Cited

U.S. PATENT DOCUMENTS

| | | | |
|---|---|---|---|
| 5,301,231 | A | 4/1994 | Abraham et al. |
| 6,009,177 | A | 12/1999 | Sudia |
| 6,026,490 | A | 2/2000 | Johns-Vano et al. |
| 6,028,939 | A | 2/2000 | Yin |
| 6,047,375 | A | 4/2000 | Easter et al. |
| 6,088,800 | A | 7/2000 | Jones et al. |
| 6,101,255 | A | 8/2000 | Harrison et al. |
| 6,138,229 | A | 10/2000 | Kucukcakar et al. |
| 6,263,429 | B1 | 7/2001 | Sisko |
| 6,434,699 | B1 | 8/2002 | Jones et al. |
| 6,691,206 | B1 | 2/2004 | Rubinstein |
| 6,725,374 | B1 | 4/2004 | Jahnich et al. |
| 6,754,819 | B1 | 6/2004 | Wootten et al. |
| 7,032,100 | B1 | 4/2006 | Fleming et al. |
| 2002/0041683 | A1* | 4/2002 | Hopkins et al. ............... 380/28 |
| 2002/0073324 | A1 | 6/2002 | Hsu et al. |
| 2004/0030908 | A1* | 2/2004 | Lin et al. ...................... 713/193 |
| 2004/0184602 | A1* | 9/2004 | Nadehara ....................... 380/28 |
| 2004/0202317 | A1 | 10/2004 | Demjanenko et al. |
| 2004/0208072 | A1* | 10/2004 | Henry et al. ................. 365/203 |
| 2004/0230813 | A1 | 11/2004 | Check et al. |
| 2005/0036617 | A1 | 2/2005 | Cheng et al. |
| 2005/0132186 | A1 | 6/2005 | Khan et al. |
| 2005/0147239 | A1 | 7/2005 | Chin et al. |
| 2005/0198500 | A1 | 9/2005 | Gaur et al. |
| 2007/0067644 | A1* | 3/2007 | Flynn et al. ................. 713/189 |

OTHER PUBLICATIONS

Weingart, "Cryptographic Microcode Loading Controller for Secure Function," IBM technical Disclosure Bulletin, Sep. 1991, pp. 34-36. (Extracted from Delphion Intellectual Property Network Website).
Compton et al., "Reconfigurable Computing: A Survey of Systems and Software," ACM Computing Surveys, vol. 34, No. 2, Jun. 2002, pp. 171-210.
Cortus Reconfigurable Cryptographic Coprocessor (RCC) Datasheet, 2005, Online: http://www.cortus.com/cryptographic_coprocessor.pdf.
Stebnisky, "CYPRIS an Application Specific Reconfigurable Processor," Lockheed Martin Advanced Technology Laboratories, 1998 Military and Aerospace Applications of Programmable Devices and Technologies Conference (MAPLD Conference), Online: http://www.klabs.org/richcontent/MAPLDCon98/Papers/pab1_stebinsky.pdf.
Kuzmanov et al., "The Virtex II Pro™ MOLEN Processor," Proceedings of the 4th International Workshop on Computer Systems: Architectures, Modelling, and Simulation (SAMOS 2004), pp. 192-202, Samos, Greece, Jul. 2004, LNCS 3133. Online: http://ce.et.tudelft.nl/publicationfiles/908_9_prototype_molen.pdf#search=%22molen%20processor%22.
Vuletic et al., "Virtual Memory Window for a Portable Reconfigurable Cryptography Coprocessor," Proceedings of the 12th IEEE Symposium on Field-Programmable Custom Computing Machines, Napa Valley, Calif., Apr. 2004.
Wong et al., "Microcoded Reconfigurable Embedded Processors: Current Developments," In Proceedings of the International Workshop on System Architecture Modeling and Simulation, pp. 207-223, Jul. 2001. Online: http://citeseer.ist.psu.edu/wong01microcoded.html.
Sierra™ II Programmable Cryptographic ASIC Datasheet, Harris Corporation, 2005, Online: http://www.rfcomm.harris.com/products/embeddable-security/sierraII.pdf.
Cast AES128-P Programmable Advanced Encryption Standard Core, Online: http://www.cast-inc.com/cores/aes128-p/cast_aes128-p.pdf, Dec. 2005.
Bowler et al., "Start your crypto engine—cryptographic acceleration in SoCs," Apr. 21, 2006, Online: http://www.networksystemsdesignline.com/howto/showArticle.jhtml?articleID=186500462.
Peter Gutmann, "An Open-source Cryptographic Coprocessor", 9th USENIX Security Symposium Paper 2000, pp. 97-112 of the Proceedings.
Fernando et al., "Design of Networked Reconfigurable Encryption Engine," fccm, pp. 285-286, 13th Annual IEEE Symposium on Field-Programmable Custom Computing Machines (FCCM'05), 2005.
Easter et al., "S/390 Parallel Enterprise Server CMOS Cryptographic Coprocessor" pp. 761-776 IBM J. Res. Develop., vol. 43, No. 5/6 1999.

* cited by examiner

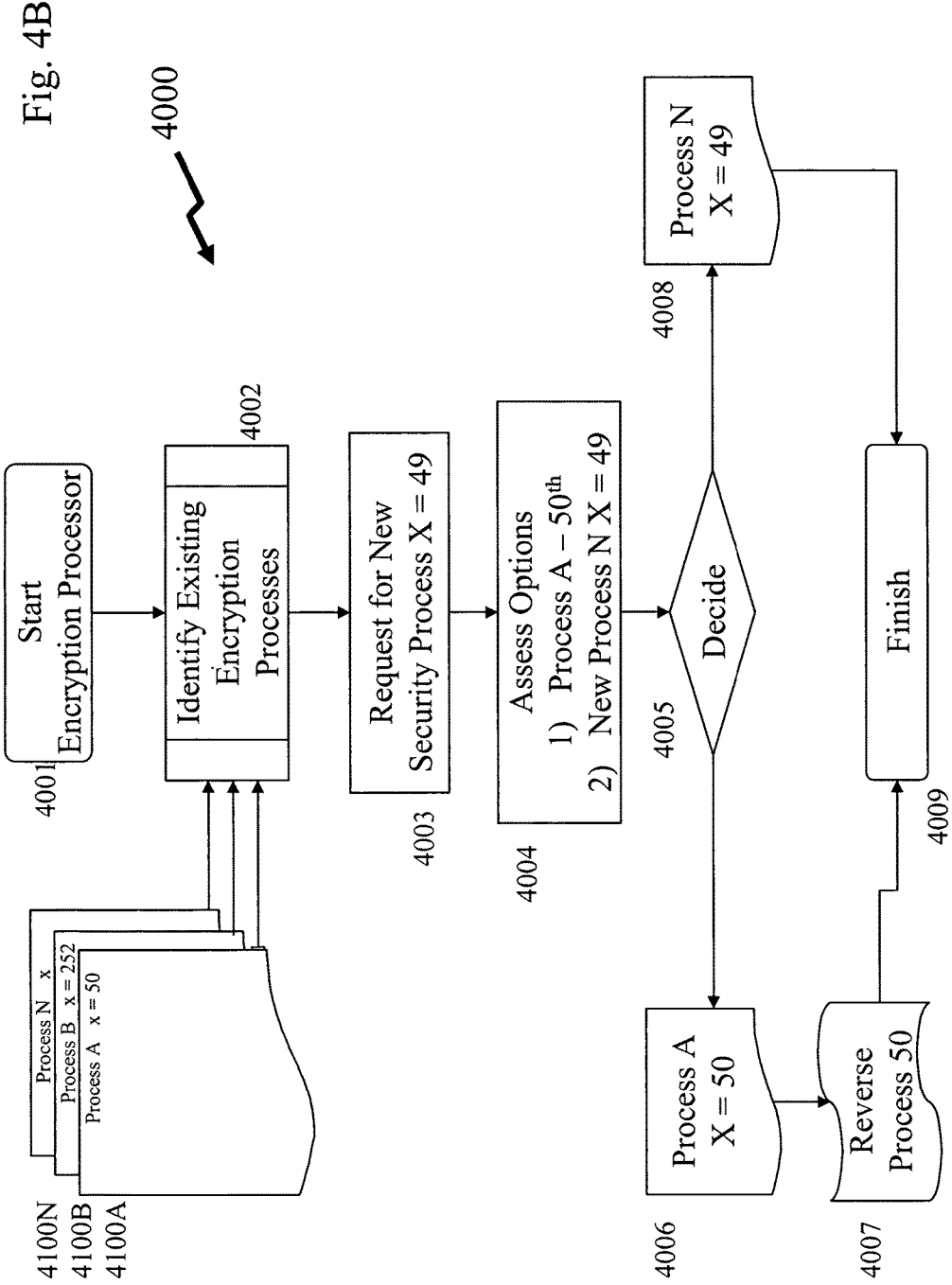

FLEXIBLE ARCHITECTURE FOR PROCESSING OF LARGE NUMBERS AND METHOD THEREFOR

This application claims the benefit of U.S. Provisional Patent Application No. 60/784,488 filed Mar. 22, 2006, the entire contents of which are incorporated herein by reference.

FIELD OF THE INVENTION

The invention relates to microprocessor architectures and more particularly to architectures of processors for processing large numbers.

BACKGROUND

In many fields the processing of large numbers is highly advantageous. One such example is within cryptographic processing where it is often necessary to add, multiply or divide numbers having a significant number of bits. For example, today one of the most popular encryption forms is the Advanced Encryption Standard (AES), also known as Rijndael, which is a block cipher adopted as an encryption standard by the U.S. Government. Already used worldwide and analyzed extensively, in electronic mail communications and digital rights management (DRM), AES is based upon a fixed block size of 128 bits and supports symmtric keys with 128, 192 or 256 bits. As such processing numbers with 256 bits is already commonplace in computers, cellular telephones, MP3 players and alike.

Enhanced cryptography techniques, employing asymmetric keys such as RSA, have become widespread for providing digital signatures, commonly known as signing, in applications distributed by Adobe and Microsoft, as well as providing encryption and decryption for electronic communications. Widely used in electronic commerce protocols typical RSA keys are between 1024 and 2048 bits, and are typically performed by users on the business or personal computers and laptops rather than handheld wireless consumer electronics. The background to this differentiation being shown below in discussing the implementation of processors supporting such large numbers. Some experts believe that 1024-bit keys may become breakable in the near term (though this is disputed); few see any way that 4096-bit keys could be broken in the foreseeable future. Therefore, it is generally presumed that RSA is secure if n is sufficiently large.

Typically, processing of large numbers with large numbers of bits is performed in one of two ways: custom hardware processors or general-purpose processors with software programming.

Considering first custom processor design, a processor is designed in silicon for use in encrypting numbers having either a fixed large number of bits or a variable number of bits, wherein the processor includes a core designed specifically for performing the operation. Examples of such custom processors including:

CAST "Proprietary AES Core" (http://www.cast-inc.com/cores/aes128-p/cast_aes128-p.pdf)

Cortus "APS3" 32 bit high performance RISC processor (http://www.cortus.com/APS3_Datasheet_Web.pdf)

Lockheed-Martin CYPRIS—Cryptographic RISC microprocessor (Proc. Military and Aerospace Applications of Programmable Devices and Technologies Conference. September 1998)

Tai-On Kwok et al "On the Design of a Self-Reconfigurable SoPC Cryptographic Engine" (Distributed Computing Systems Workshops, 2004, Proc. 24th International Conference, 23-24 Mar. 2004, pp. 876-881);

Easter et al "IBM S/390 Parallel Enterprise Server CMOS Cryptographic Coprocessor" (IBM J. of Res. & Devel., Vol. 43, No. 5/6, 1999 pp. 761-776; and Harris "SIERRA™ II" Programmable Cryptographic ASIC In use, such processors are typically highly efficient having been designed to address a single operation, and therefore, provide significant performance improvements. Unfortunately, such processors present drawbacks. For example, the processor itself must be incorporated into the hardware design during the hardware design stage and once incorporated therein, is required in every manufactured build, thereby increasing die area and hardware costs. Techniques to reduce die footprint have included sharing memory between the encryption processor with other elements of the circuit, see for example Jones et al "Encryption Processor with Shared Memory Interconnect" (U.S. Pat. Nos. 6,088,800 and 6,434,699).

A further drawback exists in that once the processor is designed into the hardware, the hardware supports the selected encryption process in an immutable fashion. Prior art to ease this constraint has been limited, and focused to flexibility of processor microcode at initial load, such as typified by Johns-Vano et al "Configurable Cryptographic Processing System and Method" (U.S. Pat. No. 6,026,490). Additionally, the processor presents a constant power drain unless additional die area and functionality are allocated to providing independent power supplies for this aspect of the integrated circuit containing the encryption processor integrated with other processor and memory elements. This limitation has been addressed with limited success by Fleming et al "Simple Algorithmic Cryptography Engine" (U.S. Pat. No. 7,032,100) and by Demjanenko et al "AES Implementation as an Instruction Set Extension" (US Patent Application 2004/0,202,317).

In contrast by employing software, it is generally relatively straightforward to design an encryption processor that is flexible, in that it supports many standards, and that is upgradeable after initial deployment through the provisioning of software revisions. For a review of software approaches see Compton et al "Reconfigurable Computing—A Survey of Systems and Hardware" (ACM Computing Surveys Vol. 34, No. 2, pp. 171-210, June 2002). Beneficially the use of software with general purpose processors allow for the known benefits flowing from processor upgrades, processor speed advances, processor power reductions, and manufacturing cost reductions of these to flow through to encryption processing. This aspect being particularly beneficial in meeting the increasing demand for improved encryption and security within high volume consumer applications such as mobile electronic devices. Further, providing such software in open source format allows for increased flexibility and integration opportunities, see for example Gutman "An Open Source Cryptographic Co-Processor" (USENIX 9$^{th}$ Security Symposium 2000, Denver, USA, 14-17 Aug. 2000) and Kucukcakar et al "Customizable Instruction Set Processor with Non-Configurable/Configurable Decoding Units and Non-Configurable/Configurable Execution Units" (U.S. Pat. No. 6,138,229)

Whilst software programming to provide the encryption process programming necessary to instruct the processor as how to process the large numbers provides additional flexibility and lower development costs, such general processors are typically designed to handle a limited number of bits simultaneously. Current general purpose processors are typically 32 bit processors, typical examples including Intel's "Pentium", "Celeron" and "Intel Core" families and AMD's K6. Current 64 bit processors have been targeted to high end server applications, such as Intel's "Itanium 2" series, AMD's "Opteron" and "Athlon 64 X2", or dedicated platforms such as gaming systems, including Microsoft's Xbox 360 using the IBM "Xenon" processor and Playstation 3's "Cell Processor" manufactured by Sony, IBM, and Toshiba. As a result 64-bit processors are lower volume, higher price parts limiting their penetration into price sensitive applications.

As general processors are designed to handle a fixed number of bits performance is a significant consideration when large numbers are processed for cryptography. The use of general processors means that these can process only a subset of bits within each processing operation, thereby requiring significant overheard to provide for partial processing of results, namely the subset of the bits currently being processed, and then further overhead in combining the partial results to form a complete result. Thus, the use of general-purpose processors for encryption processing is not ideal when processing efficiency is required. For example, a 1024 bit encryption using an Intel Core 2 processor with 32 bit processing requires 32 processing operations. Additional complexity and issues arise in many applications when the data being processed in such small groups is networked, adding further overhead and management functions, as evident in Gaur et al "System and Method for Performing Security Operations on Networked Data" (US Patent Application 2005/0,198,500).

In an attempt to overcome these drawbacks, it is evermore common for hardware encryption processor designs to incorporate cores for each of many different encryption standards such that a single chip may have four or five processing cores, each for processing in accordance with a different type of encryption. Examples of such approaches in the prior art including Easter et al "Cryptographic Processor with Interchangeable Units" (U.S. Pat. No. 6,047,375) and Harrison et al "Programmable Cryptographic Processing System and Method" (U.S. Pat. No. 6,101,255). Alternatively, techniques to speed up cryptographic processing with general processors have addressed issues such as the latency within general processor operations, see for example Check et al "Cryptographic Co-Processor on a General Purpose Microprocessor"

Such an encryption chip is more flexible, allowing for use with a variety of encryption standards, allowing for selection of the encryption standard after the hardware is built and allowing for variation of the encryption standard during use. Unfortunately, the inclusion of more than one processing core within a hardware processor adds significantly to the die area of the integrated circuit and therefore to the cost. Further, each of the processor cores remain fixed in their functionality and, as such, are not upgradeable once manufactured. To address this limitation techniques have been proposed to provide multiple general purpose processors to form distributed encryption engines, such as Wooten et al "Method and System for Providing Cryptographic Services in a Distributed Environment" (U.S. Pat. No. 6,754,819).

All of the approaches presented above, suffer limitations in respect of cost and flexibility when considering the deployment of multiple high security encryption processes, such as employed for electronic commerce, in high volume, low cost consumer electronic devices. It would be advantageous therefore to provide an encryption processor for processing such large numbers that has the necessary flexibility of encryption process without substantially increased the cost of such consumer device hardware.

SUMMARY OF THE INVENTION

In accordance with the invention there is provided a processor comprising: an integrated circuit comprising: a processor core comprising hardware for implementing a plurality of commands, each command addressable by an instruction, the plurality of commands including a first plurality of large number processing operations including an operation common to a plurality of encryption processing processes, and a second plurality of processing operations including an operation common to general purpose microprocessors; and a program controller for retrieving of instruction data and for executing a series of instructions in response to the instruction data, the series of instructions for resulting in security processing, the instruction data reprogrammable for supporting different security processes and modifications to security processes.

In accordance with yet another aspect of the invention there is provided a method of encryption processing comprising: providing a processor having a core for supporting a first plurality of large number processing operations including an operation common to encryption processing, a second plurality of processing operations including an operation common to general purpose microprocessors, and program execution; providing a first transform for use in transforming of data from a first form to a second form; re-characterizing the transform as a second transform for performing a same transformation, the second transform utilizing operations from the first plurality of large number processing operations; and, providing micro code instruction data for performing the second transform.

In accordance with yet another aspect of the invention there is provided a memory storage device having data stored thereon, the data for when executed resulting in an integrated circuit design comprising: a processor core comprising hardware for implementing a plurality of commands, each command addressable by an instruction, the plurality of commands including a first plurality of large number processing operations including an operation common to a plurality of encryption processing processes, and a second plurality of processing operations including an operation common to general purpose microprocessors; and a program controller for retrieving of instruction data and for executing a series of instructions in response to the instruction data, the series of instructions for resulting in security processing, the instruction data reprogrammable for supporting different security processes and modifications to security processes.

BRIEF DESCRIPTION OF THE DRAWINGS

Exemplary embodiments of the invention will now be described in conjunction with the following drawings, in which similar reference numbers designate similar items.

DETAILED DESCRIPTION OF EMBODIMENTS OF THE INVENTION

Figure 1:
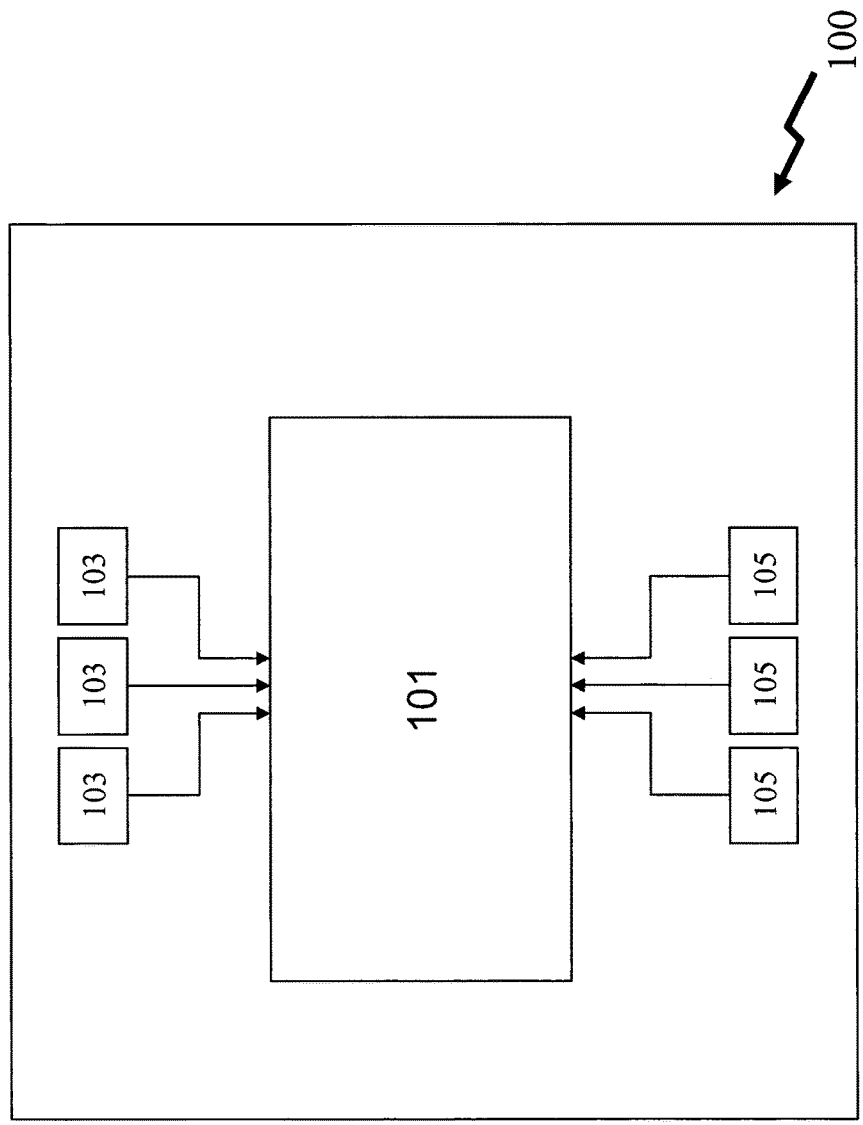
FIG. 1 shows a simplified block diagram of an encryption processor for implementing a single encryption process.

Referring to FIG. 1, shown is an encryption processor 100 according to the prior art. As shown, the processor includes a core 101, a number of address data ports 103 for receiving address data and a number of data ports 105 for receiving input data for processing thereof are coupled with the core 101 for use in passing data to and from the core 101. The address ports 103 and the data ports 105 accessible are used by an external processor or process to transfer data for encryption thereof into the integrated circuit. Once the data is transferred to the integrated circuit the integrated circuit processor core 101 accesses internal memory for processing of the data. Typically, processing the data is performed in parallel for all the data to provide maximum throughput. Alternatively, processing the data is performed in a pipeline fashion wherein data is processed at different stages of the encryption process one after another with subsequent data processing parallel to current data processing at a different stage of the process. It is evident from reviewing FIG. 1 that the processor 100 shown supports only a single encryption process and that same process is applied to data provided thereto.

Figure 2:
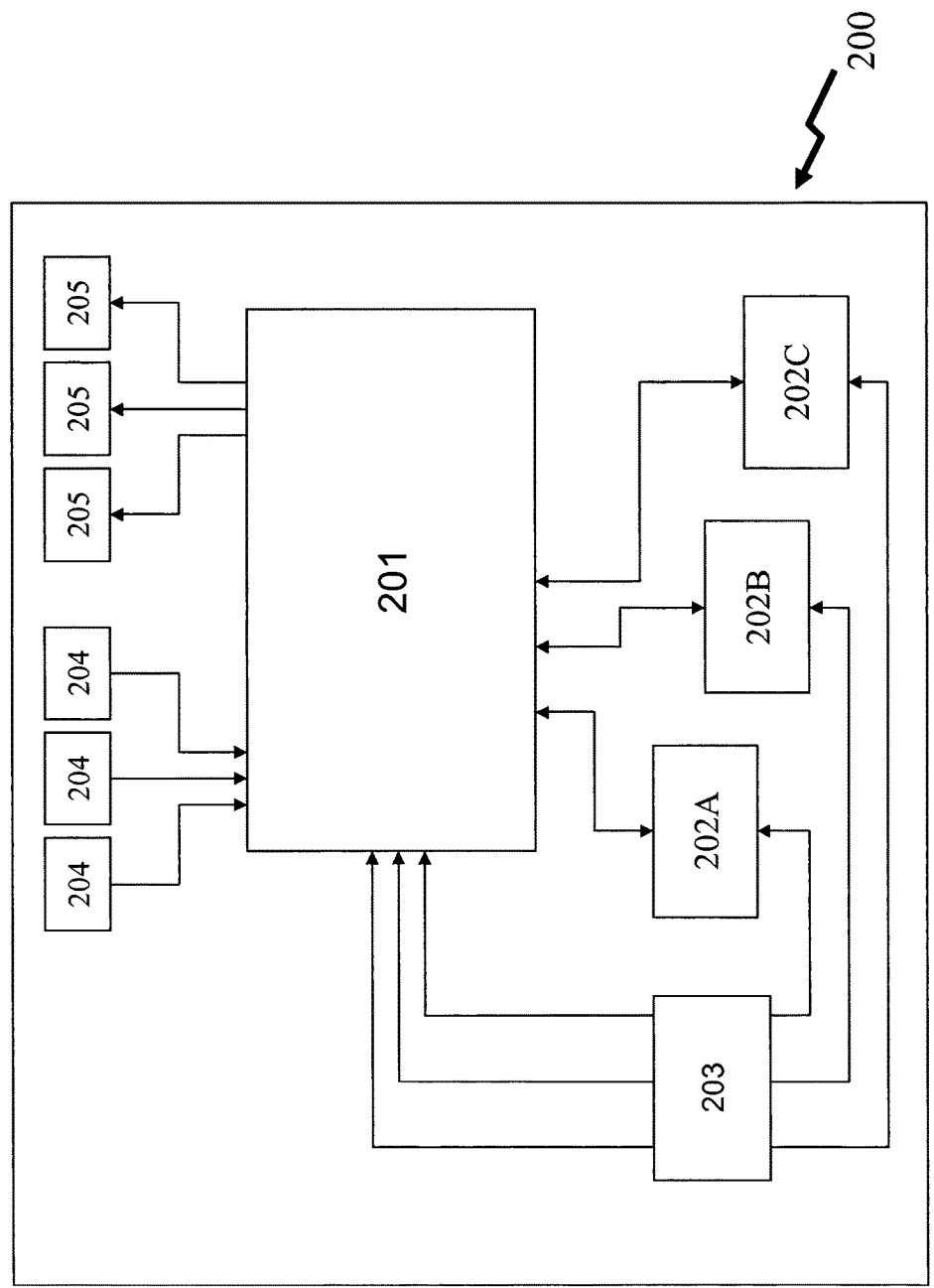
FIG. 2 shows a simplified block diagram of an encryption processor for implementing a plurality of encryption processes, each encryption process supported by a different processing core.

Referring to FIG. 2, another simplified block diagram of an encryption processor 200 according to the prior art is shown. Here the processor 200 includes memory 201, processor core 202a, processor core 202b, and processor core 202c, processor selection memory 203, data ports 204, and address data ports 205. Data is provided to the processor using the data ports 204 and the address data ports 205 and stored in the memory 201. Into the processor selection memory 203 is stored data indicative of which of the processors 202(a), 202(b) or 202(c) is to be used for processing of the data. Once the data is stored in the memory 201 and a processor core is selected, the processor core is engaged to process the data in accordance with a process of that processor core. The output results are typically stored in the same memory as the input data. From there, they are provided from the integrated circuit to an external processor.

As is evident, the processor of FIG. 2 is far more flexible than the processor of FIG. 1. Unfortunately, three processor cores increase the real estate area of the integrated circuit increasing the cost of designing and of manufacturing such a processor. As such, there are many applications wherein such a processor is cost-prohibitive.

Figure 3:
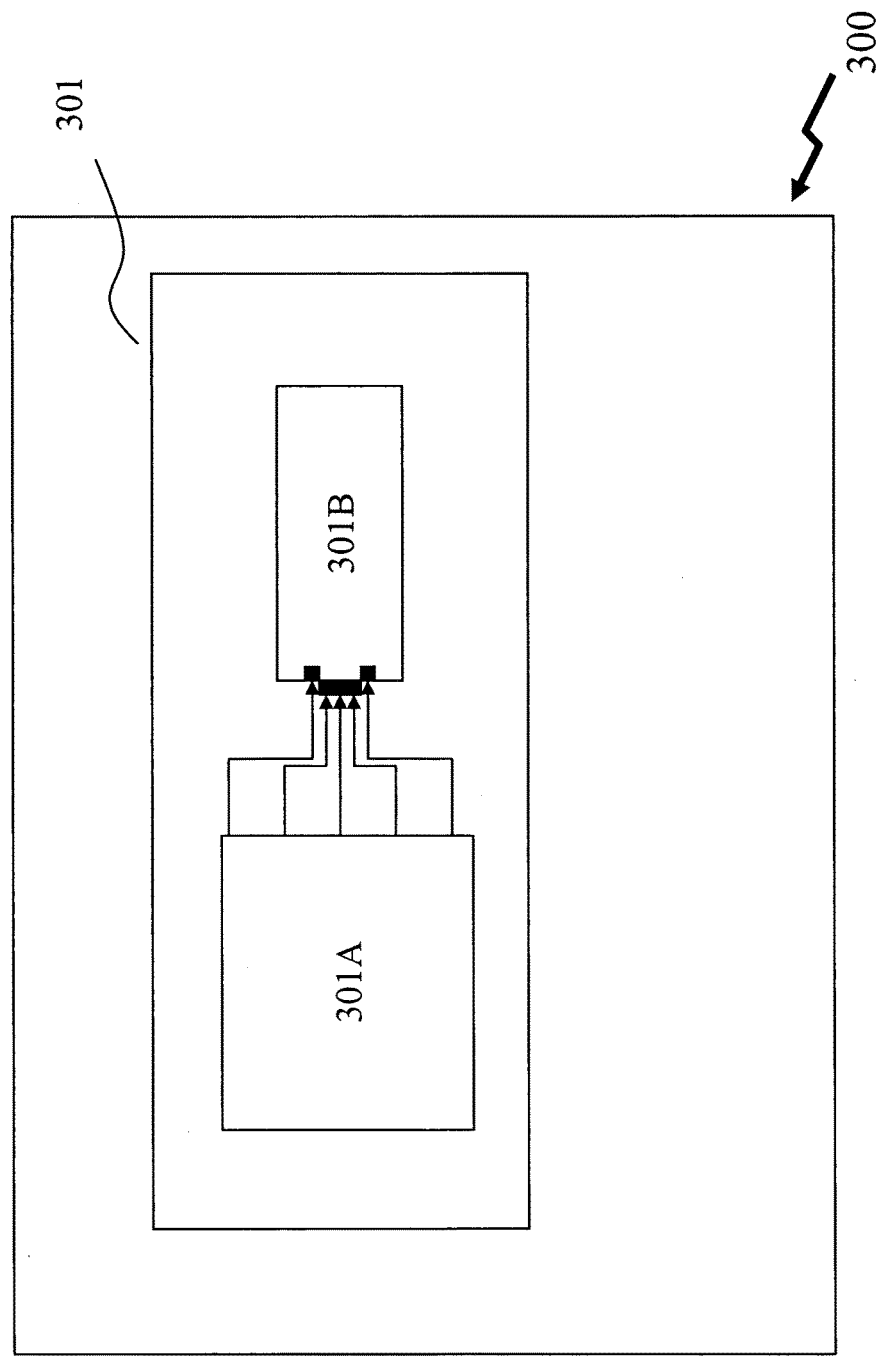
FIG. 3 shows a simplified block diagram of a processor for implementing a plurality of security processes within a single core according to an embodiment of the invention; and, FIG. 4A is a first simplified flow diagram of a method providing flexibility in encryption process for use with the encryption processor of FIG. 3 according to an embodiment of the invention.

Referring to FIG. 3, a processor 300 in accordance with the invention is shown. Here, a single processor core 301 is provided including a micro code memory portion 301a and a hardware portion 301b. Within the micro code memory portion 301a is stored micro code indicative of a series of instructions for execution one after another or in accordance with a known sequencing thereof, the instructions for execution by the processor core 301b. Within the processor core 301b are a plurality of functional support blocks (not shown) each for supporting different functions, ranging from simple functions such as concatenation, addition and subtraction to large number processes and complex functions typically used in encryption processing. As such, the processor core supports some of both the generic processing ability of a general purpose processor along with function specific processing in accordance with typical known encryption processors.

Into the micro code memory 301a is stored micro code for instructing the processor in its operation. Typically, relying on the micro code programming results in short executable programs for implementing a known standard encryption process. Optionally, these programs are themselves implemented hierarchically within the micro code relying on previously implemented programs for use in larger or other programs.

As standard encryption processes change, improve or are enhanced through the addition of further processing, the further processing is programmable within the micro code memory 301a for execution by the processing core. When the high level processing operations of the processing core are desired within the sequence of processing for encrypting data, those high level operations are invoked and provide enhanced efficiency of hardware designed solutions including, when desired, parallel implementation, pipelined implementation, large number processing and hardware specific processing allowing for implementation of different steps in combination or in conjunction with each other to enhance processing efficiency. Thus the resulting processing core is implementable for most efficiently supporting the processing of data in accordance with specific predetermined encryption standards without limiting the processing core to only supporting those standards and without requiring a further processing core. In effect, the high level processing blocks within the processing core allow for dramatic increases to efficiency over typical programmable encryption processors without reducing the flexibility of the encryption processor. Further, a plurality of the processing blocks is for supporting very simple instructions for allowing for a considerable amount of flexibility in the encryption process.

Figure 4A:
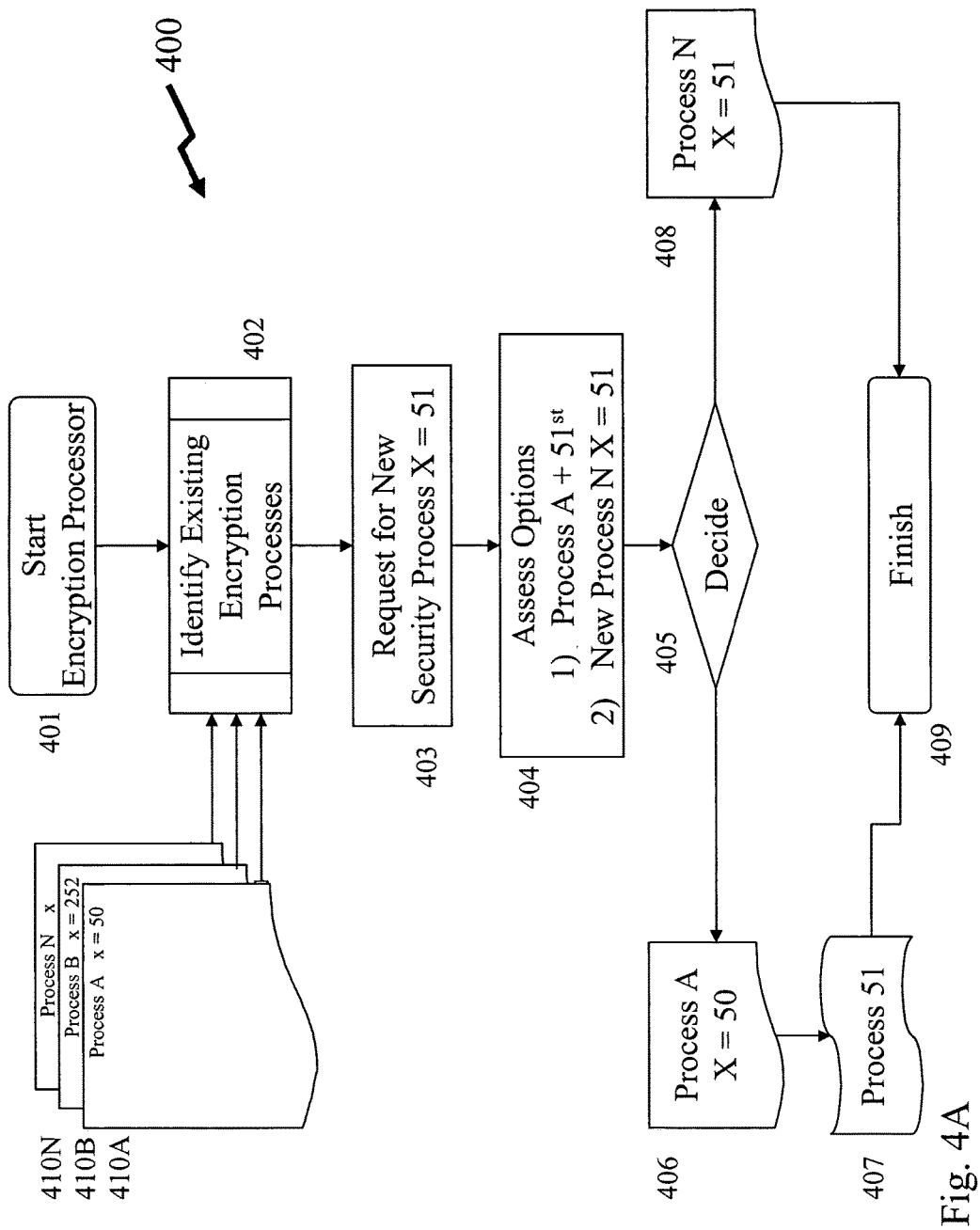
FIG. 4B is a second simplified flow diagram of a method providing flexibility in encryption process for use with the encryption processor of FIG. 3 according to an embodiment of the invention . . . .

Referring to FIGS. 4A and 4B simplified flow diagrams of a method of designing an encryption process for use with an encryption processor according to the invention are shown. Here, the encryption processor is known as is its micro code command set. A process being selected for implementation on the processor.

A typical encryption process can be characterized as a mathematical process to transform data provided thereto into different output data. Due to the mathematical nature of the encryption process, it is possible to rearrange operations within that process in order to bring about a same transform. For example, the transform A×B×C may be formed by firstly generating the product of A×B and multiplying the result thereof by C or by first generating the product of B×C and multiplying this result thereof by A. Each implementation results in an equivalent result. As such an encryption process, being a transform, provided for implementation on the processor is re-characterizable to combine or recombine the transform mathematically to provide a result that is equivalent, but significantly includes operations that are different in aggregate. This is a common practice in the art of mathematics wherein simplifying of results often requires grouping of terms. Further, the operations that are different in aggregate are often similar or the same individually. For example in the above-mentioned example several multiplication operations are performed; but they are all the same operation or process.

A security process 400 in the form of a transform is evaluated to extract therefrom processes that in aggregate are equivalents of existing high level encryption operations that are supported in hardware by the processor. For example, as shown in FIG. 4A, the encryption processor upon starting at step 401 identifies existing supported encryption processes at step 402, these processes being Process A 410A, Process B 410B, through to an unassigned Process N 410N. Process A 410A includes for example what would be 50 simple mathematical operations. Process B 410B includes for example 252 simple mathematical operations. Of course, the processes Process A 410A and Process B 410B are both large number processes. Thus the security process 400 evaluates the request for a new security process at step 403 and finds that 51 operations are present, and that 50 of them are present in Process A 410A. The $51^{st}$ step may be performed separately.

The security process 400 assesses the options at step 404 and makes a decision in step 405 as to which process to execute. If the decision is that the Option 1 is more efficient then the security process 400 would execute Process A first in step 406 and then the $51^{st}$ mathematical operation at step 407. If the security process 400 decides Option 2 is more effective then the security process 400 generates and executes Process N of 51 mathematical operations in step 408. In either case the security process progresses to step 409 and terminates.

In this exemplary embodiment the new process is more efficient, when implemented on the processor, than implementing A in 50 separate operations and then implementing the $51^{st}$ operation. As such it is more efficient to include the high level operation supported in the hardware resulting in two micro code instructions as opposed to performing all 51 operations, independently. Thus, the resulting micro code does not necessarily represent the optimized flow path for encryption processing, but it is preferably an optimized flow path for the processor core provided and is much preferable to implementing the security process on a general-purpose processor.

In FIG. 4B a second exemplary security process 4000 is outlined. As shown in FIG. 4A the encryption processor upon starting at step 4001 identifies existing supported encryption processes at step 4002, Process A 4100A, Process B 4100B, through to an unassigned Process N 4100N. Process A 4100A being 50 simple mathematical operations, and Process B 4100B being 252 simple mathematical operations, both being large number processes. Thus the security process 4000 evaluates the request for a new security process at step 4003 and finds that 49 operations are required, and all are present in Process A 4100A. The $50^{th}$ step may be reversed separately.

The security process 4000 assesses the options at step 4004 and makes a decision in step 4005 as to which process to execute, Option 1 being to execute Process A first in step 4006 and then reverse the $50^{th}$ mathematical operation at step 4007, and Option 2 being to generate and executes Process N of 51 mathematical operations in step 408. In either case the security process progresses to step 409 and terminates. Due to the inefficiency of reversing the $50^{th}$ operation, the decision at step 4005 is to generate the new Process N with 49 mathematical operations in step 4008.

Here, it is very likely that a single extra process will result in less inefficiency than implementing a lot of operations to perform a function supported in hardware. As such it is more efficient to include the high level operation supported in the hardware and then reverse the $50^{th}$ operation with a single operation call resulting in two micro code instructions as opposed to performing all 50 operations, independently. Thus, the resulting micro code does not represent the optimized flow path for encryption processing, but it is preferably an optimized flow path for the processor core provided and is much preferable to implementing the security process on a general-purpose processor.

Though the above examples in FIGS. 4A and 4B are simplified, similar processes are performed for much more complex re-characterization of transforms. For example, several large number operations may combine to provide an equivalent of some portion of the transform. Alternatively, one large number operation is used to reverse a portion of another large number operation. For example, with A and B, where A reverses 50 operations of B, the result of applying B then A is the application of the remaining 202 operations. Depending on the implemented instruction set within the processor core, it is possible to support a large number of standards in a highly efficient though not optimized fashion.

The resulting processing for most encryption operations is highly advantageous over a general-purpose processor due to support for efficient large number processing commands. Similarly, the processor and method are more efficient than a single devoted purpose processor because the processor is upgradeable and modifiable resulting in many significant advantages such as an ability to patch security flaws, an ability to support multiple standards with less die area, an ability to add support for a new security standard, an ability to reduce parts in inventory for a manufacturer, and an ability to manufacture a single product supporting many regions and applications each of which may require different standards.

Figure 5:
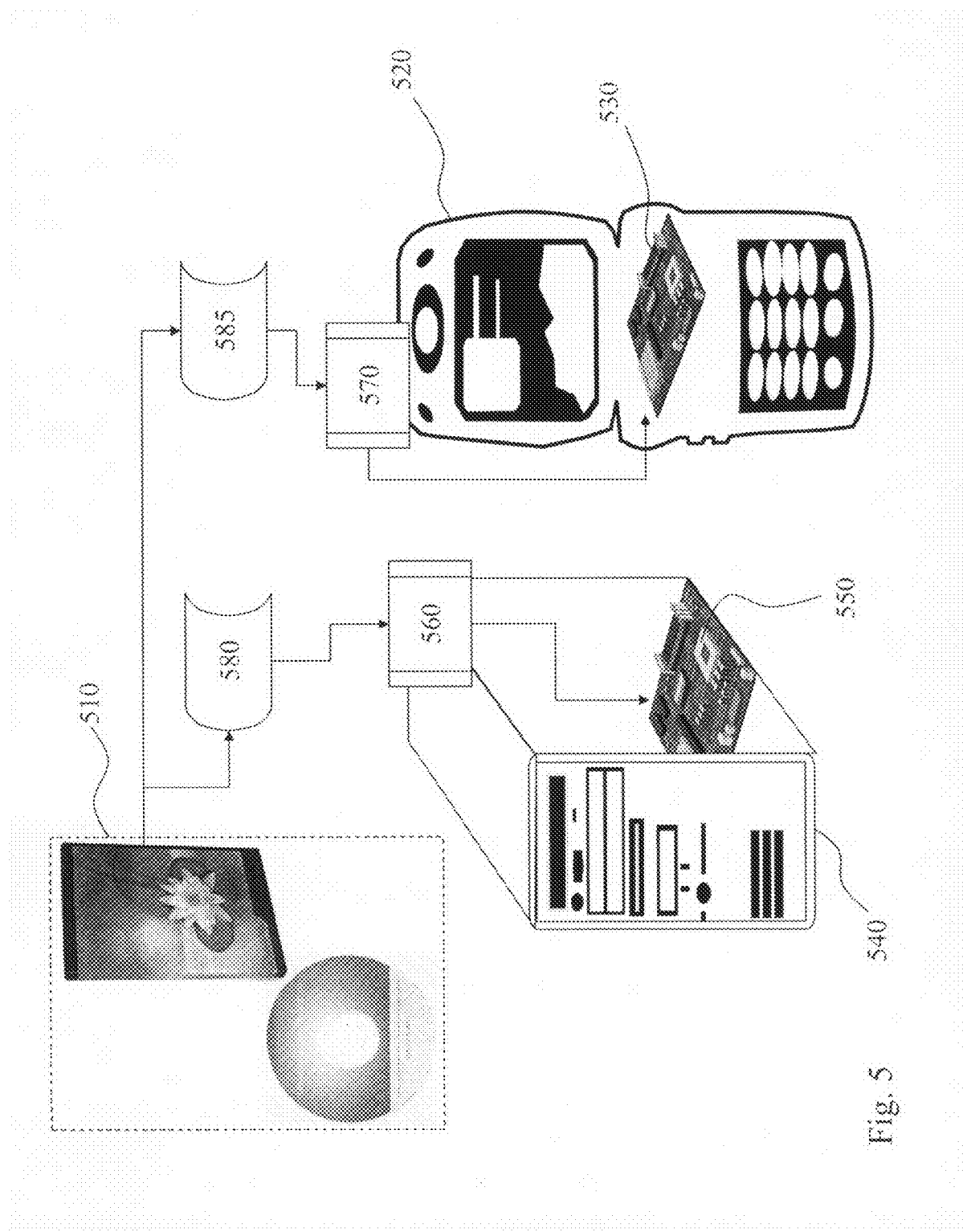
FIG. 5 is an exemplary deployment scenario of an embodiment of the invention within two different computer systems, one a desktop computer, the other a cellular telephone.

Accordingly, as the resulting processing of encryption operations involving the processing of large numbers is highly advantageous on general purpose processors FIG. 5 depicts a deployment scenario for a software based modification to the firmware of general processors within two different computer systems, the first a desktop computer 540 and the second a cellular telephone 530. A user, not shown for clarity, purchases an encryption suite 510, the purchase being triggered by an event, including but not limited to a security breach, a requirement to upgrade or add security to allow electronic commerce activities or electronic communications, etc. Whilst the encryption suite 510 is shown within FIG. 5 as a physical CD purchased other embodiments would be evident including but not limited to downloading the encryption suite 510 from the Internet from an approved supplier.

The user upon inserting the CD containing the encryption suite 510 into a suitable drive, not shown for clarity, of their desktop computer 510 is presented with a first initial entry screen 580 whereupon user related information is provided before the encryption suite 510 proceeds to execute the installation of the encryption processes and firmware, software, and hardware updates required for operation of the encryption suite 510 within the desktop computer 540, these being shown as loading process 560. In performing this loading process 560 the encryption suite 510 interrogates hardware and firmware elements 550 of the desktop computer 540 in order to establish the correct settings and update interfaces, drivers, memory registers and other aspects of the desktop computer 540. Accordingly, the encryption suite 510 configures the encryption processes according to the microprocessor, memory, etc. of the system.

As the user who purchased the encryption suite 510 also owns a cellular telephone 520 from which they also perform electronic commerce, amongst their many activities benefiting from enhanced encryption, they interconnect their cellular telephone 520 to the encryption suite 510 to begin the process of increasing their encryption and security processes. As such the user is now presented with a second initial entry screen 585, which within this exemplary embodiment differs from the first initial entry screen 580 as the encryption suite 510 recognizes the device as a portable cellular device rather than a desktop PC. At second initial entry screen 585 the user enters information relating to their identity, legitimate ownership of the encryption suite 510, and acceptance of license obligations and user agreements. The encryption suite then 510 proceeds to execute the installation of the encryption processes and firmware, software, and hardware updates required for operation of the encryption suite 510 within the desktop computer 520, these being shown as loading process 570. In performing this loading process 570 the encryption suite 510 interrogates hardware and firmware elements 530 of the cellular telephone 520 in order to establish the correct settings and update interfaces, drivers, memory registers and other aspects of the cellular telephone 520. Accordingly, the encryption suite 510 configures the encryption processes according to the microprocessor, memory, etc of the system.

In performing the installation of the encryption suite 510 upon two different devices, the desktop computer 540 and cellular telephone 520, the configuration settings are adjusted to reflect the differences in hardware, firmware, and software of these two different systems employing general purpose microprocessors. As such in configuring the encryption suite 510 for the desktop computer 540 the configuration will typically be based upon a 32-bit, possibly 64-bit, dual core (or quad) microprocessors operating at 1.8 GHz and above with high speed EEPROM memory caches of 1 Mb or more. In contrast in configuring the encryption suite 510 for the cellular telephone 520 the configuration will typically be based upon a 16-bit, possibly 32-bit, single core microprocessor operating at 640 MHz with limited EEPROM memory caches of 128 kb, possibly 256 kb.

It is evident therefore that the exemplary embodiments of the invention allow the encryption suite 510 to be loaded onto a wide range of general purpose microprocessors. In doing so the encryption processes, involving large number multiplication and exponentiation operations, adapts to the configuration of the microprocessor in respect of speed, arithmetic primitive of the microprocessor (16-bit, 32-bit, 64-bit, etc), width of data buses interfacing to memory, cache memory dimensions etc.

Figure 6:
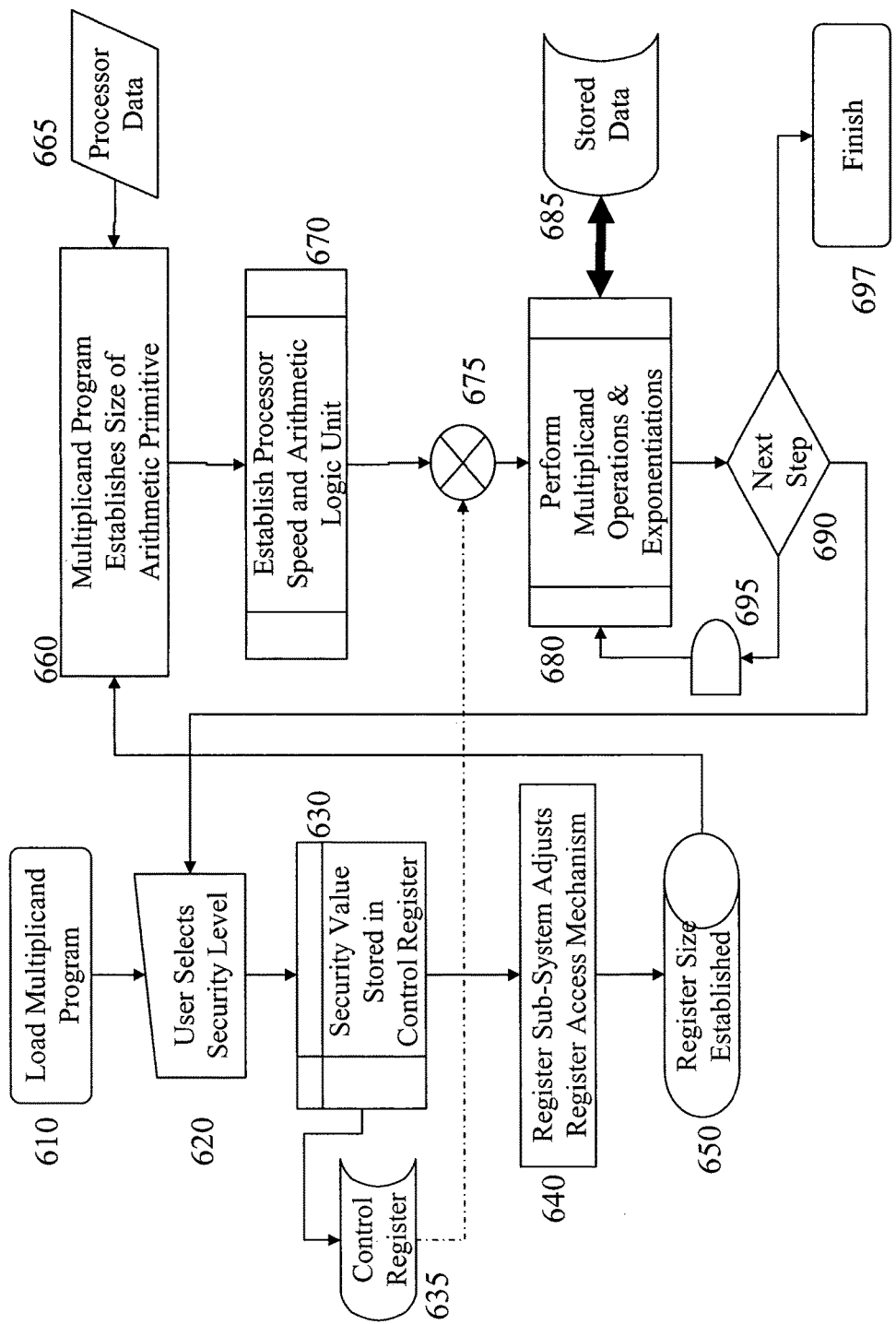
FIG. 6 is an exemplary flow diagram of an embodiment of the invention configuring execution of a large number multiplicand program according to the configuration of the hardware platform.

Referring to FIG. 6 is shown an exemplary flow diagram for the process of configuring the encryption processes according to the firmware and hardware of the system hosting the encryption processes. As shown at step 610 the multiplicand program providing the encryption processes is loaded, and at step 620 the user selects a security level. This security level is stored in step 630 within a control register at step 635, wherein the register subsystem controlling access and read/write operations to memory registers adjusts in step 640 according to this stored value such that all registers accessed by the encryption process will be the correct size, namely 1024-bits. Such register formatting being completed in step 650.

Next the multiplicand program, forming a portion of the encryption process, establishes the size of the arithmetic primitive which will be employed in multiplicand, and exponentiation processes, in step 660. This is provided from data stored in memory, at step 665, by the microprocessor relating to, but not limited to cache memory format, processor speed, and processor configuration. Based upon the resulting data the multiplicand program establishes in step 670 the required processor speed and arithmetic logic unit that will form the basis of the multiplicand and exponentiation steps of the encryption process.

In conjunction with the control register value, representing required level of encryption, which is retrieved at step 675, the encryption process proceeds to retrieve data from memory in step 685 and perform the required multiplicand and exponentiation operations in step 680 to encrypt the data. Upon completing the required encryption processes the process proceeds to step 690 wherein a decision is made. The first being to encrypt additional data, which may include a delay 695 pending storage of new data to encrypt, at which point the process returns to step 680. The second being option portrayed being to finish in which even the process moves to step 697 and terminates. Alternatively, the decision is made to adjust the level of encryption between a first encryption process and a second encryption process, for example the user logs out of one electronic commerce site supporting 256-bit encryption and logs into another requiring 1024-bit encryption. In this case the process returns to step 620 wherein a new security level is entered.

Now the process flows through again, writing a new value into the control register at step 635, establishing new register sizes in steps 640 and 650, and processing new encryption at step 680 on new data retrieved in step 685 from memory. Optionally, step 620 is replaced with an automatic process establishing the required degree of encryption or security, such as 512-bit RSA or 1024-bit RSA. Such an automatic process may engage stored information regarding the users electronic commerce provider, prior transactions, etc to automatically determine the standard (RSA, AES, etc) and level of encryption (256-bit, 512-bit, 1024-bit, etc). Similarly, the level of encryption stored within the control register at step 635 may be explicit, i.e. 1024, or derived, i.e. 10 (representing the power of base 2 for the required bit-level), or itself encrypted.

Preferably, the processor core also supports some basic instructions for use in implementing processes such as those in general purpose processors. Inclusion of support for basic instructions facilitates transformation of the first security process into a process rewritten to optimize the use of the plurality of large number operations supported within the processor core. Further, the inclusion of support for basic operations facilitates modifications and enhancements to the security process when those modifications are small changes to the process. Advantageously, basic instructions are implementable with little die area. Further advantageously, basic instructions are implementable using standard libraries for processors.

Due to the programmability of the above-described processor, distribution of patches, modifications, upgrades, and new programming are greatly facilitated. The instruction data is optionally provided in electronic form for being programmed into the processor, for example by a process commonly referred to as "flashing" read only memory therein. Thus, the present invention is well suited to high security applications due to its ability to be patched and to consumer electronic devices due to its ease of upgrade, modification, or repair.

Numerous other embodiments may be envisioned without departing from the spirit or scope of the invention.

What is claimed is:

1. A method for performing a cryptographic process, the method comprising:
    receiving a security level for processing the cryptographic process;
    storing the security level in a control register;
    transforming a first cryptographic process into a process rewritten to optimize the use of a plurality of large number operations supported within a core processor; and
    executing the first security process on the core processor based on the security level stored in the control register and how the core processor is implemented.

2. The method of claim 1, further comprising establishing a memory register size, wherein the memory register is used for processing large number multiplication and exponentiation associated with the cryptographic process.

3. The method of claim 2, further comprising:
    receiving a new security level; and
    repeating establishing a memory register size based on the new security level.

4. The method of claim 1, wherein the implementation of the core processor can be altered without changes to the sequence of operations executed by the core processor.

5. The method of claim 1, wherein the security level is selected from the group consisting of 512, 1024, or 2048 bits long.

6. A non-transitory, tangible computer-readable storage medium comprising instructions for:
    receiving and storing a security level in a control register;
    using the security level to determine how the execution of a sequence of operations is performed by a core processor; and
    executing the operations independent of how the core processor is implemented.

7. A processor comprising:
    a control register storing a security level; and
    a non-transitory, tangible computer-readable storage medium comprising instructions for executing a predetermined sequence of operations on a core processor based on the security level stored in the control register, wherein the predetermined sequence of operations is transformed into a process rewritten to optimize the use of a plurality of large number operations supported within the core processor.

8. The processor of claim 7, further including a core processor for executing the sequence of operations in response to the instructions.

* * * * *